United States Patent [19]

Huang et al.

[11] Patent Number: 5,625,454
[45] Date of Patent: Apr. 29, 1997

[54] INTERFEROMETRIC METHOD FOR OPTICALLY TESTING AN OBJECT WITH AN ASPHERICAL SURFACE

[75] Inventors: June-Jei Huang, Taipei; Chie-Ching Lin, Taichung, both of Taiwan

[73] Assignee: Industrial Technology Research Institute, Hsinchu, Taiwan

[21] Appl. No.: 449,393

[22] Filed: May 24, 1995

[51] Int. Cl.$^6$ .................................................. G01B 9/02
[52] U.S. Cl. .................................................. 356/359
[58] Field of Search .................................. 356/359, 360

[56] References Cited

U.S. PATENT DOCUMENTS

| 4,743,117 | 5/1988 | Kitabayashi et al. | 356/360 |
| 5,004,346 | 4/1991 | Kohel | 356/360 |
| 5,416,586 | 5/1995 | Tronolone et al. | 356/359 |

OTHER PUBLICATIONS

"Profile Measurement of an Aspheric Cylindrical Surface From Retroreflection", Ding–tin Lin, et al., Applied Optics, vol. 30, No. 22, Aug. 1991, pp. 3200–3204.

*Primary Examiner*—Samuel A. Turner
*Attorney, Agent, or Firm*—Merchant, Gould, Smith, Edell, Welter & Schmidt, P.A.

[57] ABSTRACT

A method for testing an object with an aspherical surface. Based on the theory that an aspherical surface is composed of a plurality of spherical surfaces with different radii, the method tests the profile of said aspherical object by positioning the focus of an interferometer on the curvature centers of the plurality of spherical surfaces, recording the relative displacement of the aspherical object and the referenced spherical surfaces and calculating the aberrations therebetween.

7 Claims, 8 Drawing Sheets

INTERFEROMETRIC METHOD FOR OPTICALLY TESTING AN OBJECT WITH AN ASPHERICAL SURFACE

BACKGROUND OF THE INVENTION

The present invention relates to a method for testing aspherical surfaces. The method is based upon the principle that an aspherical surface is composed of various spherical surfaces of different radii of curvature.

There are many interferometric methods available nowadays for measuring the objects having an aspherical surface. The interferometric methods can be classified into null tests and non-null tests. Neither of these methods, however, can effectively measure the shape of an aspherical object. The null tests have the following disadvantages:

(1) To measure different objects having an aspherical surface, specially designed optical devices are needed. Therefore, the cost is extremely high and it is difficult to build such devices; and (2) The compensating effects of the null optics cannot be independently measured.

With respect to the non-null tests, the disadvantages are as follows:

(1) The density of interferograms at the edge of the measured object is generally larger than the resolution which can be offered by the image capturing device; and (2) Generally an optical system is designed for one spherical surface. If many spherical surfaces are used simultaneously, aberrations occur in the optical system itself.

Subaperture optical testing techniques have been developed to solve the above problems. The techniques determine the deviation of the tested aspherical surface from a referenced spherical surface at each movement of the aspherical surface and calculates segmental profiles of the aspherical surface according to the deviation at each movement. The whole profile of the aspherical surface is calculated by combing the segmental profiles. The calculation is complex since it should determine each segmental profile of the aspherical surface.

The reference entitled "Profile Measurement of an Aspherical Cylindrical surface from Retroreflection" by Ding-Tin Lin and Der-Shen Wan, published on APPLIED OPTICS, Vol. 30, No. 22, Aug, 1, 1991 discloses a way to analyze an aspherical surface by measuring the fringe density of the interferogram reflected from the aspherical surface with an interferometer, and to scan a region in the interferogram having a smaller fringe density by changing the reflection angle. However, this method can only be used in analyzing cylindrical surfaces, but not for measuring an arbitrary objects with aspherical surface.

SUMMARY OF THE INVENTION

One object of the present invention is to provide a method of testing aspherical surfaces, which can overcome the problems associated with the above testing techniques.

Based on the principle that an aspherical surface is composed of various spherical surfaces with different radii of curvature, the method uses a plurality of referenced spherical surfaces with different radii of curvature instead of a fixed referenced spherical surface to detect the profile of the aspherical surface. According to the characteristic that at the intersection point of a referenced spherical surface and the tested aspherical surface, only the light entering into the interferometer along the normal line of the referenced spherical surface will be reflected back to the aspherical surface through the same path. By finding out the intersection points for each referenced spherical surface and the aspherical surface and calculating the lateral deviation of each referenced spherical surface from the tested aspherical surface, the profile of the object can then be determined.

A further object of the present invention is to provide a method for testing an aspherical surface which can be applied to the general interferometer so that the cost of the product can be reduced and it is suitable for automatic production.

These and other objects, advantages and features of the present invention will be more fully understood and appreciated by reference to the written specification.

DETAILED DESCRIPTION OF THE PREFERRED EMBODIMENT

The present invention is based on the principle that an aspherical surface is composed of a plurality of spherical surfaces of different radii of curvature. In accordance with the present invention, the tested aspherical surface is set on an optical axis of an interferometer. By moving the tested surface along the optical axis, we can compare the tested surface with the referenced spherical surfaces with different radii of curvature. When the radius of curvature at a certain point on the aspherical surface (intersected with the referenced spherical surface) is equal to that of a referenced spherical surface, the normal line passing through this point of the aspherical surface will also pass through the focus of the interferometer. The light beam from the focus reflected by the point will also go back along the same incoming path but in a reverse direction. Therefore, in accordance with the above principle, the present invention first detects the intersection points of the aspherical and referenced spherical surfaces and then calculates the deviation of the referenced spherical surface from the aspherical surface to be tested by an integration calculation to obtain the shape of the aspherical surface.

Figure 1:
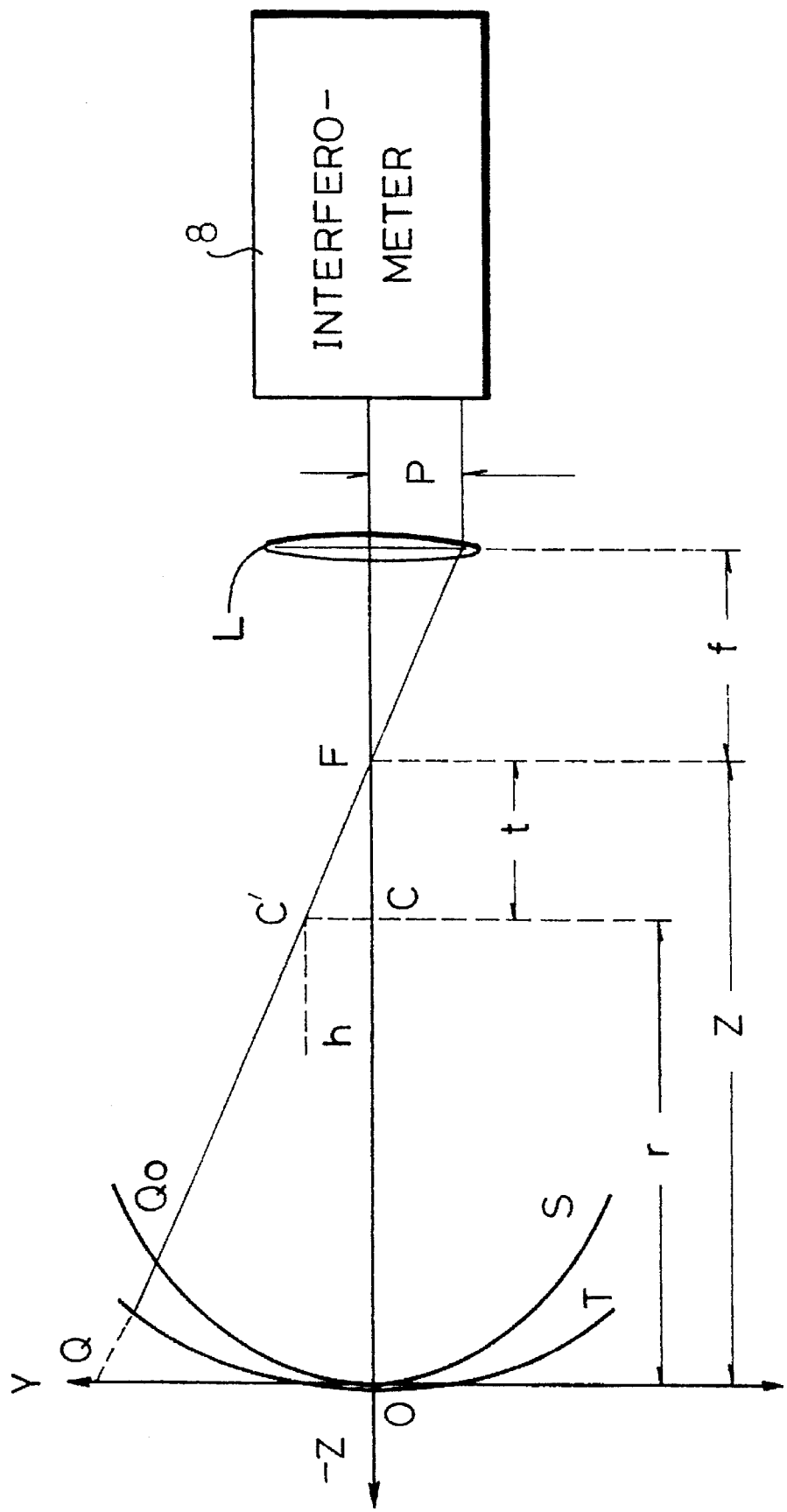
FIG. 1 shows an optical schematic view for testing the shape of an aspherical surface in accordance with the present invention.
Figure 2:
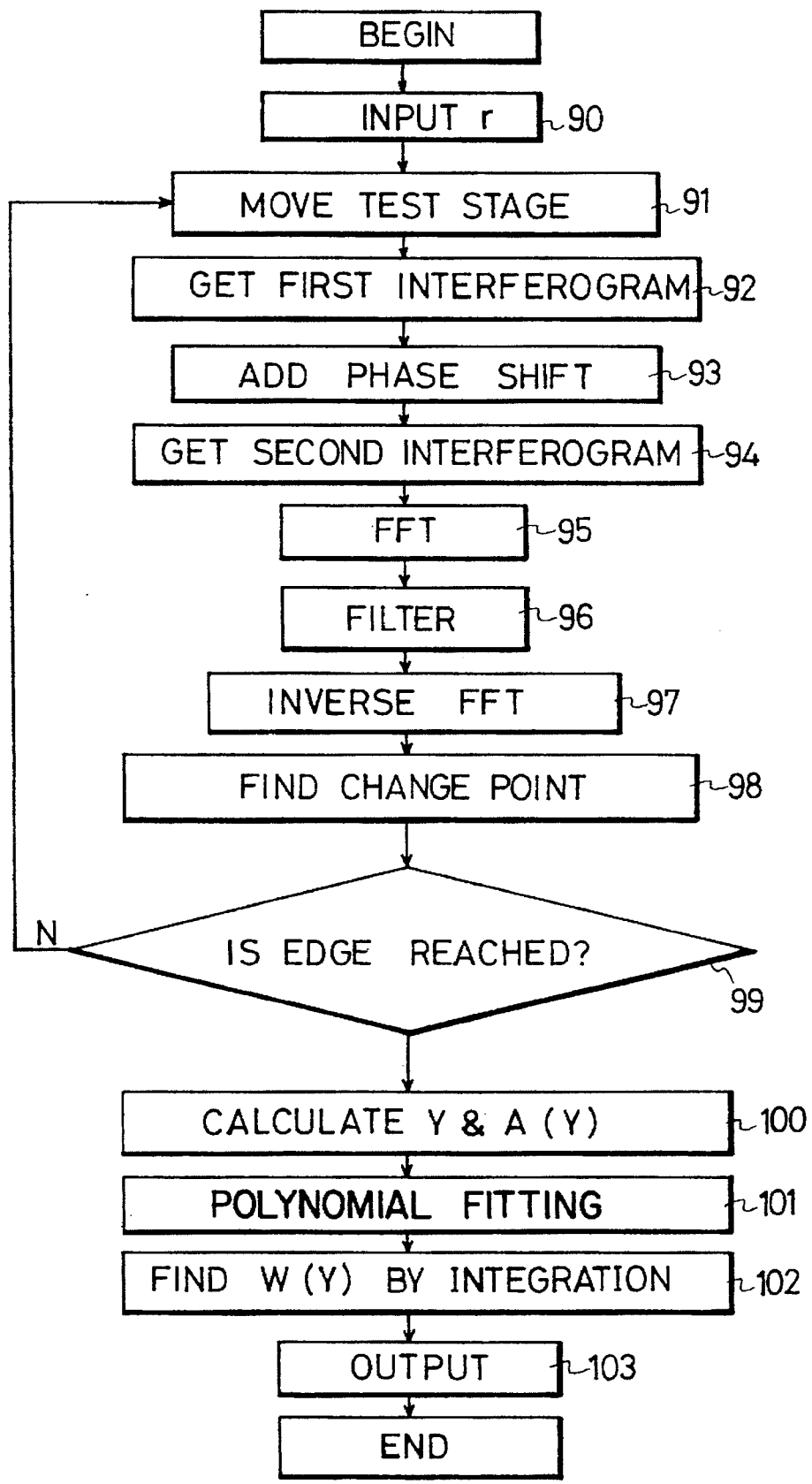
FIG. 2 shows a flow chart of the method for testing the shape of an aspherical surface in accordance with the present invention.

Referring to FIG. 1, it shows a geometry diagram for testing an aspherical surface in accordance with the present invention. In the figure, curve T represents the aspherical surface to be tested and S represents a referenced spherical surface with a paraxial radius of curvature r. Both the aspherical surface T and the referenced spherical surface S are rotationally symmetric about the optical axis of an interferometer 8. Moreover, point F represents the focus of the diverger L of the interferometer 8, C is the center of the referenced spherical surface S, t is the displacement of the aspherical surface to be tested and Z is the distance from the cross point of one normal line of the aspherical surface T and the light axis of the interferometer 8 to the vertex of the aspherical surface T. As the focus moving to a position at which the displacement t of the focus plus the radius r is equal to Z, a normal line of the spherical surface S intersects the optical axis of the interferometer 8 at the focus point F. The sign of t is positive when F is at the right side of C, and negative when F is at the other side.

Figure 5A:
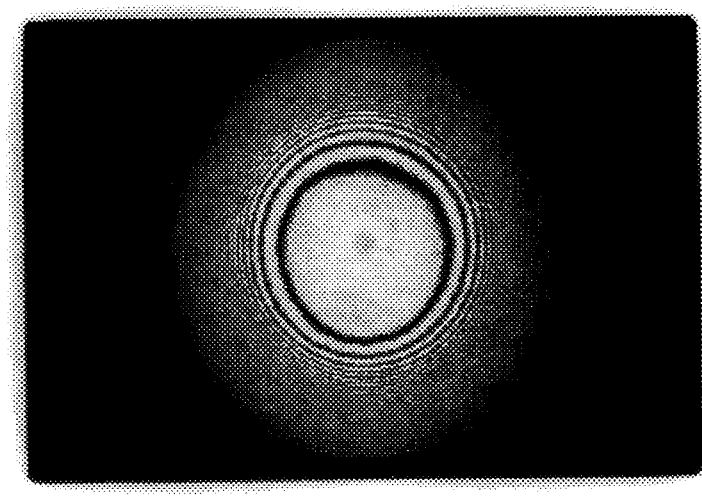
FIG. 5(a) and 5(b) each show the annular interferogram produced by the interferometer.
Figure 5B:
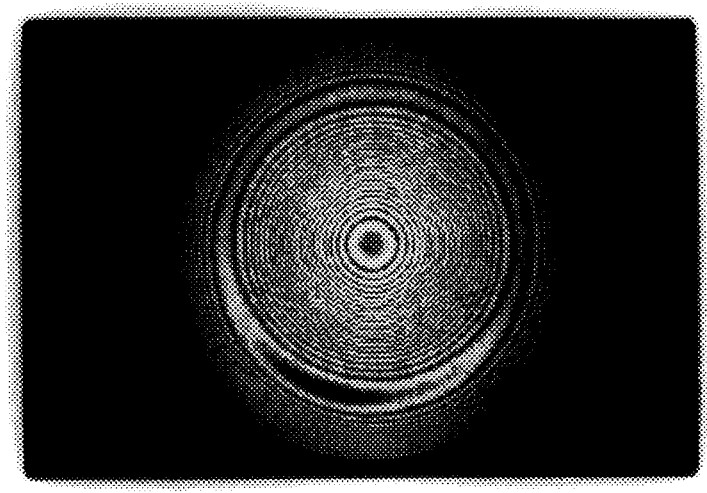

In addition, as the image grabbed by the interferometer, the measured interferograms should be annular-shaped, as shown in FIGS. 5(a) and 5(b). Since the light from the intersection point of the referenced spherical and aspherical surface will be reflected back through the identical incoming path, the interferograms obtained at this point will have a smallest density. Therefore, the location of the intersection point can be obtained by using an image capturing device (such as CCD) to record the interferograms generated by the interferometer 8 and find out the point where the interferogram density is smallest. The distance from this point to the center of the lens L is represented by p in FIG. 1. The precise computations of p are described in the following.

In space, light emitted from one point (A) to the other point (A') is following the shortest distance rule. The passing length represented by V(A, A') is defined as the characteristic function of the space in which A and A' is the position vectors.

Assuming that L, M, N are the directional cosine of the light, then the relations of the parameters are as follows: (see W. T. Welfore: "Aberration of the Symmetrical Optical System", P. 75)

$$nL = \frac{\partial V}{\partial x} ; nM = \frac{\partial V}{\partial y} ; \text{and } nN = \frac{\partial V}{\partial z}$$

wherein n is the refractive index of the space.

Now considering the space is as the optical system shown in FIG. 1. Thus, the aberration of the tested aspherical surface and the referenced spherical surface is:

$$QQ_0 = W(y) = V(F, Q) - V(F, Q_0) = V(F, 0) - V(F, Q_0) \quad (1)$$

wherein $QQ_0$ is the distance between the aspherical surface T and the referenced spherical surface S along the normal line of the spherical surface and V is the characteristic function, therefore $$\partial W/\partial y = 0 - (\partial V/\partial y + \partial V/\partial z + \partial z/\partial y) \quad (2)$$

The referenced spherical surface can be represented by $$y^2 + z^2 - 2rz = 0 \quad (3)$$

thus $$\partial W/\partial y = -(M + N*y/(r-Z)) \quad (4)$$

According to FIG. 1, $$M = (h-y)/Q_0 C' \text{ and } N = (r-Z)/Q_0 C' \quad (5)$$

Substituting Eq. (5) into Eq. (4), we get $$h = -Q_0 C'* \partial W/\partial y \quad (6)$$

Thus, $$W(y) = -\int h/Q_0 C'* dy \quad (7)$$

h in Eq. (7) is the lateral aberration, its value can be obtained from the geometric relation shown in FIG. 1, which $$h = P/f * t \quad (8)$$

In addition $$[z-(r+t)]/y = f/P \quad (9)$$

Combining Eq. (3) and Eq. (9) to obtain $$y = \frac{t*p/f[1 + \sqrt{[1+p/t)^2 * (r/t)^2 - (p/f)^2}\ ]}{1 + (P/f)^2} \quad (10)$$

From the geometric relationship shown in FIG. 1, we get $$\frac{Q_0 C}{\sqrt{(r^2 - y^2)}} = \frac{\sqrt{(f^2 + p^2)}}{f} \quad (11)$$

$$\rightarrow Q_0 C' = r[1-(y/r)^2]^{1/2} * [1-(y/f)^2]^{1/2} \quad (12)$$

Now let $$A(y) = \frac{t*p/f}{[1+(p/f)^2]^{1/2} * [1-(y/f)^2]^{1/2}} \quad (13)$$

The deviation can thus be determined as $$W(y) = -1/r_t \int A(y) \, dy \quad (14)$$

The present invention uses a series of measured values of t and p/f to obtain a series of y and A(y), then calculates the parameters of the polynomials by using least square method and intergrates the lateral aberration h using Eq. (14) to obtain the deviation W(y) and the aspherical surface to be tested.

Parameter values r, t, f and p as stated above can be determined by different measuring methods. The parameter f is the focal length of the diverger L of the interferometer 8 and its effective value should be pp(r+tt−Zs)/D, wherein pp is the range of the interferometer in the final step, tt is the total displacement of the aspherical surface to be tested, Zs is the coordinate of the referenced spherical surface on Z-axis and D is the radius of the tested surface. The paraxial radius r can be measured by curvature radius testing equipment and the displacement t of the aspherical surface T can be obtained by using an optical rule or laser range finder. The methods for obtaining these parameters can be varied as necessary which are not limited in the present invention. The location of the intersection point of the reference spherical surface and the tested aspherical surface can be determined directly from the interferograms shown in FIGS. 5(a) and 5(b) by observing fringe peaks which remain unchanged in two interferograms. However, this usually involves the problems of error by the observation with naked eyes and the inaccuracy associated with the limited resolution of the image capturing device. To resolve these problems, the present invention introduces a new method for obtaining the location of the intersection point.

Figure 3:
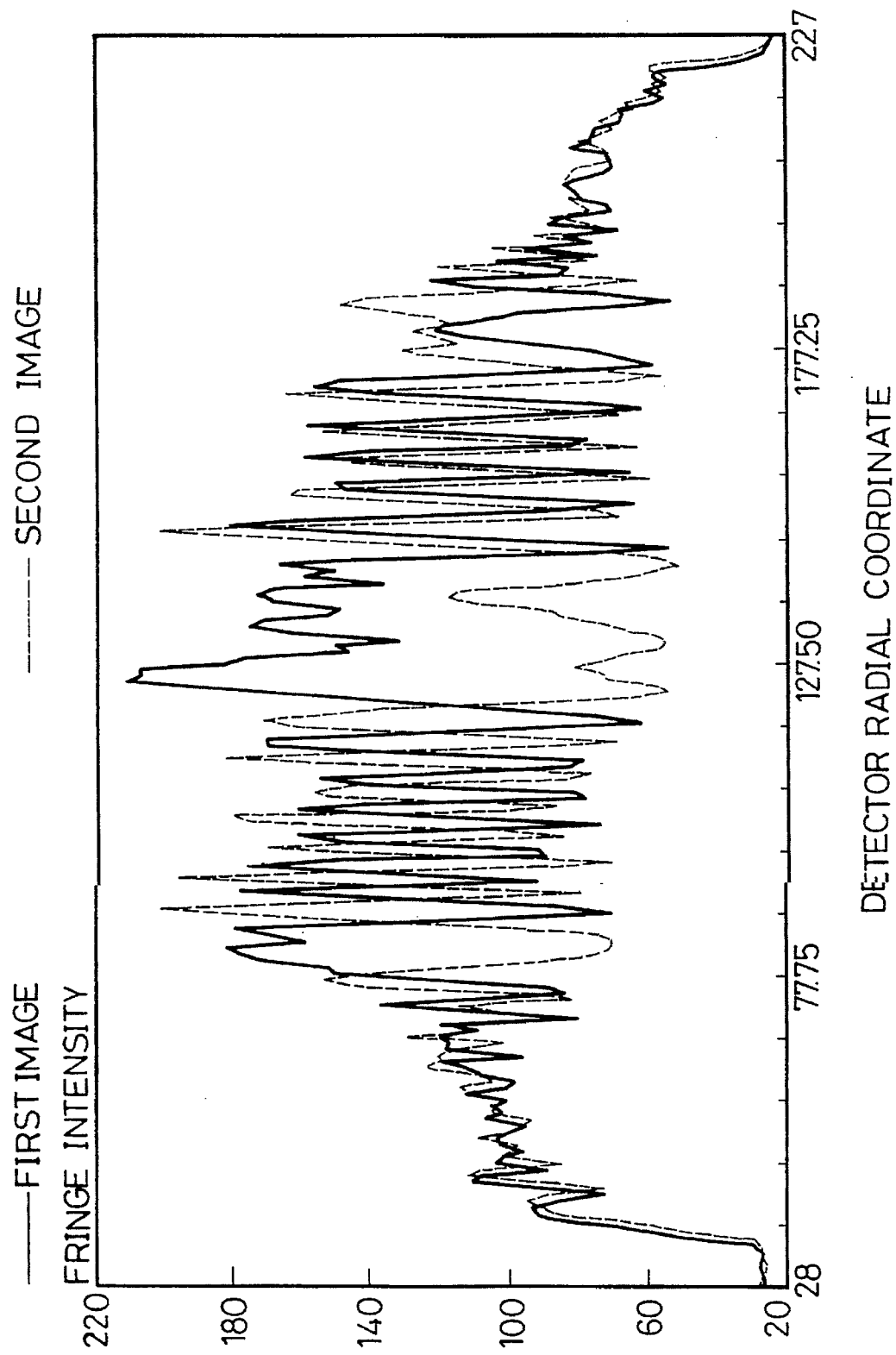
FIG. 3 is a diagram showing the interferogram tested by the method in accordance with the present invention when the interferometer is positioned on a first and second positions, respectively.

FIG. 3 is a flowchart showing the determination steps of the intersection point of the present invention. At step 90, it first measures the paraxial radius of the tested aspherical surface. The tested aspherical surface is moved to a first position along the optical axis of the interferometer (step 91) to read the displacement t of the tested aspherical surface and to obtain a first interferogram (step 92). The interferogram at step 92 is shown as the solid curve in FIG. 3. The tested aspherical surface is then slightly moved to a second position (step 93) to produce a phase shift and thus obtain a second interferogram as shown in the dotted curve in FIG. 3 (step 94). At step 95, a Fast Fourier Transform is performed for these two curves respectively to generate spectral distribution curves corresponding to these two interferograms. The positive or negative part of the distribution curve is filtered (step 96) and the inverse Fast Fourier Transform is performed to restore the phase of the interferograms (step 97). It can be seen from the curves that only at the peaks which are exactly the locations of the intersection points of the referenced spherical and tested aspherical surface, the curve will cross the zero axis in both phase curves (for example, these locations marked "*" on the axis in FIG. 4) by the above transform processing steps. Therefore, the locations of the intersection points can be calculated from the interferogram (step 98), and the locations of the intersection points are exactly the values of parameter p.

After the locations of the intersection points are obtained, it should be determined whether the measured results have reached the edge of the test aspherical surface (step 99). If not, then the processing goes back to step 91 and repeats the measurements by using other referenced spherical surfaces with different radii of curvature. If the edge has been reached, steps 100, 101 and 102 are carried out by calculating the A(y) value according to Eq. (13). The lateral aberration is represented by the polynomial A(y) (step 101). By integrating A(y), the deviation W(y) can be obtained (step 102) and the profile of the tested aspherical surface can be obtained.

An example is now given to illustrate the method of the present invention. In this example, a Twyman-Green interferometer is used. Other kind of interferometers can of course be used. The tested aspherical surface is placed on a movable plate whose movement can be controlled by a personal computer and the displacement can be measured by a laser range finder.

The radius of curvature of the tested aspherical surface is first measured to be 4.80 mm and the focal length f is measured to be 183 * (4.8–0.50030–0.6584)mm/3.7 mm, where the values 183, –0.5003 and 0.6584 are the parameter values for pp, tt, and Zs, respectively, and 3.7 mm is the radius of curvature of the tested aspherical surface. The distance between the tested aspherical surface and the focus of the diverger L is equal to the paraxial radius r, and the interferogram is shown in FIG. 5(a). It can be seen from the figure that the central area of the interferogram has a smallest density, while the outer areas of the interferogram is denser.

When the tested aspherical surface is moved toward the focus of the diverger by a small distance, the focus of the diverger coincides with the curvature center of outer region. FIG. 5(b) shows the interferogram at this condition. From this figure, it can be seen that the wide bright fringe (sparse fringe) is moved from the central region to an outer region. The closer the tested aspherical surface is moved to the diverger, the farther out the wide bright fringe moves.

Figure 4:
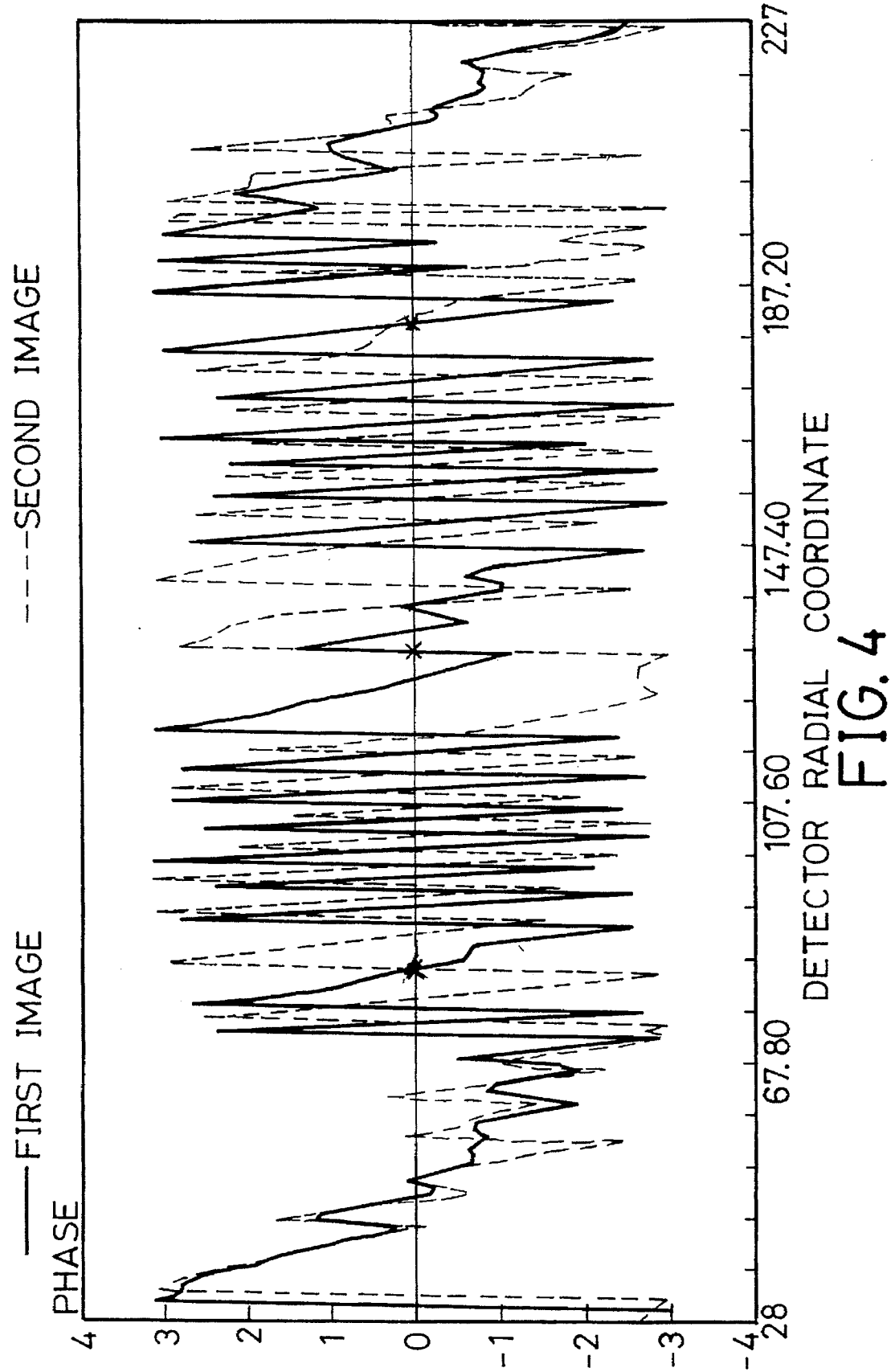
FIG. 4 shows the phase distribution obtained from FIG. 3 after processing by a Fast Fourier Transform, negative-wave filtering and a Fast Inverse Fourier Transform.

In the above example, the total displacement was divided into 37 steps so that the wide bright region was moved from the center to the edge. FIG. 3 shows the first interferogram (solid line) obtained at the Nth step and the second interferogram (dotted line) obtained at the (N+1)th step, and after processing by Fourier Transform, filtering and inverse Fourier Transform, the interferogram of FIG. 4 is obtained. The peak locations according to the definition stated above can be found at pixels 82, 131 and 182. The peak locations in each step of the 37 steps of this example are recorded, and these values are p values in Eqs. (13) and (14). Substituting the measured p values and other referenced values into Eqs. (13) and (14), the profile coordinates of the tested aspherical surface can be found.

Figure 6:
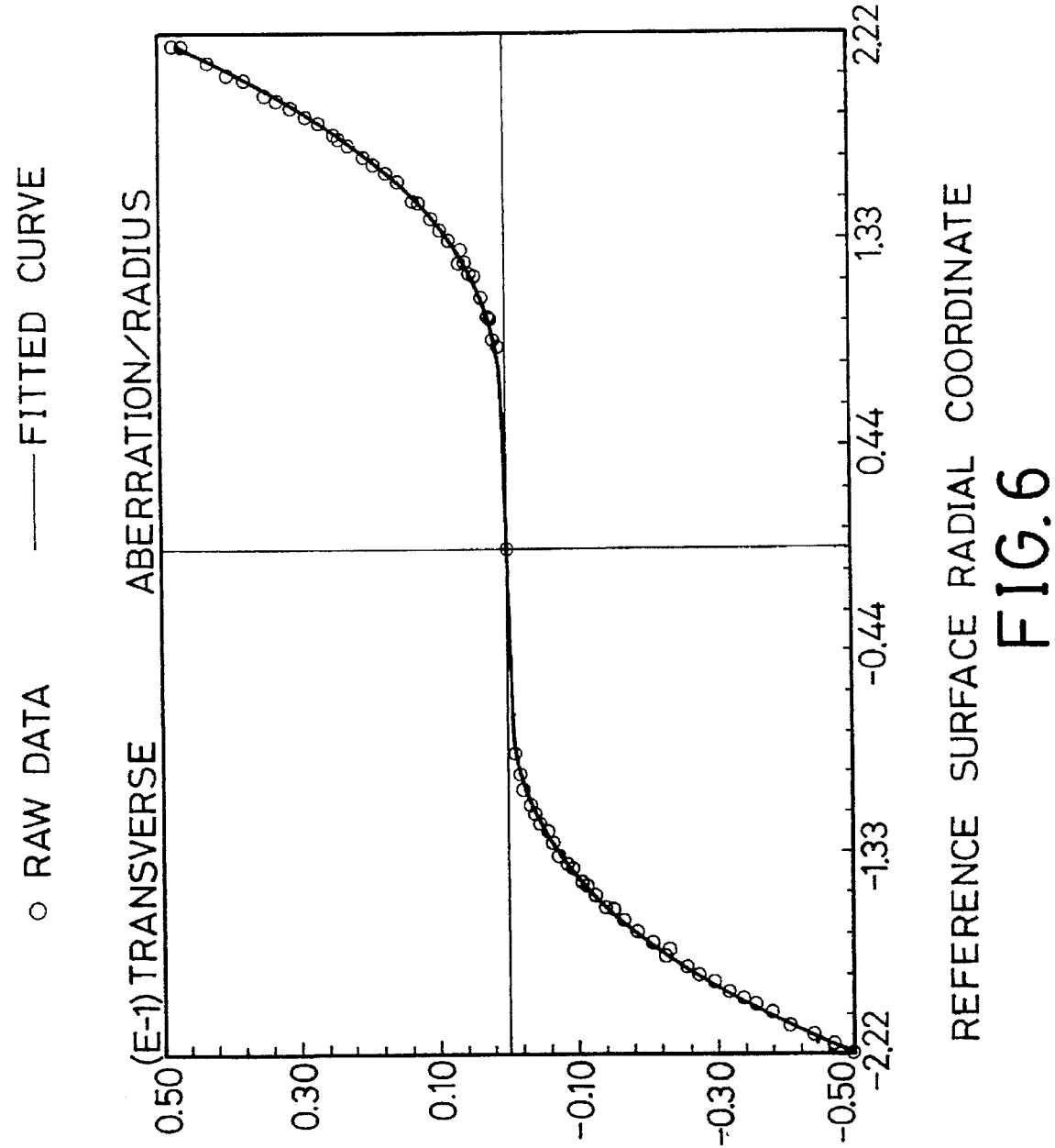
FIG. 6 is a curve showing the lateral aberration curve of the tested aspherical surface at various positions.
Figure 7:
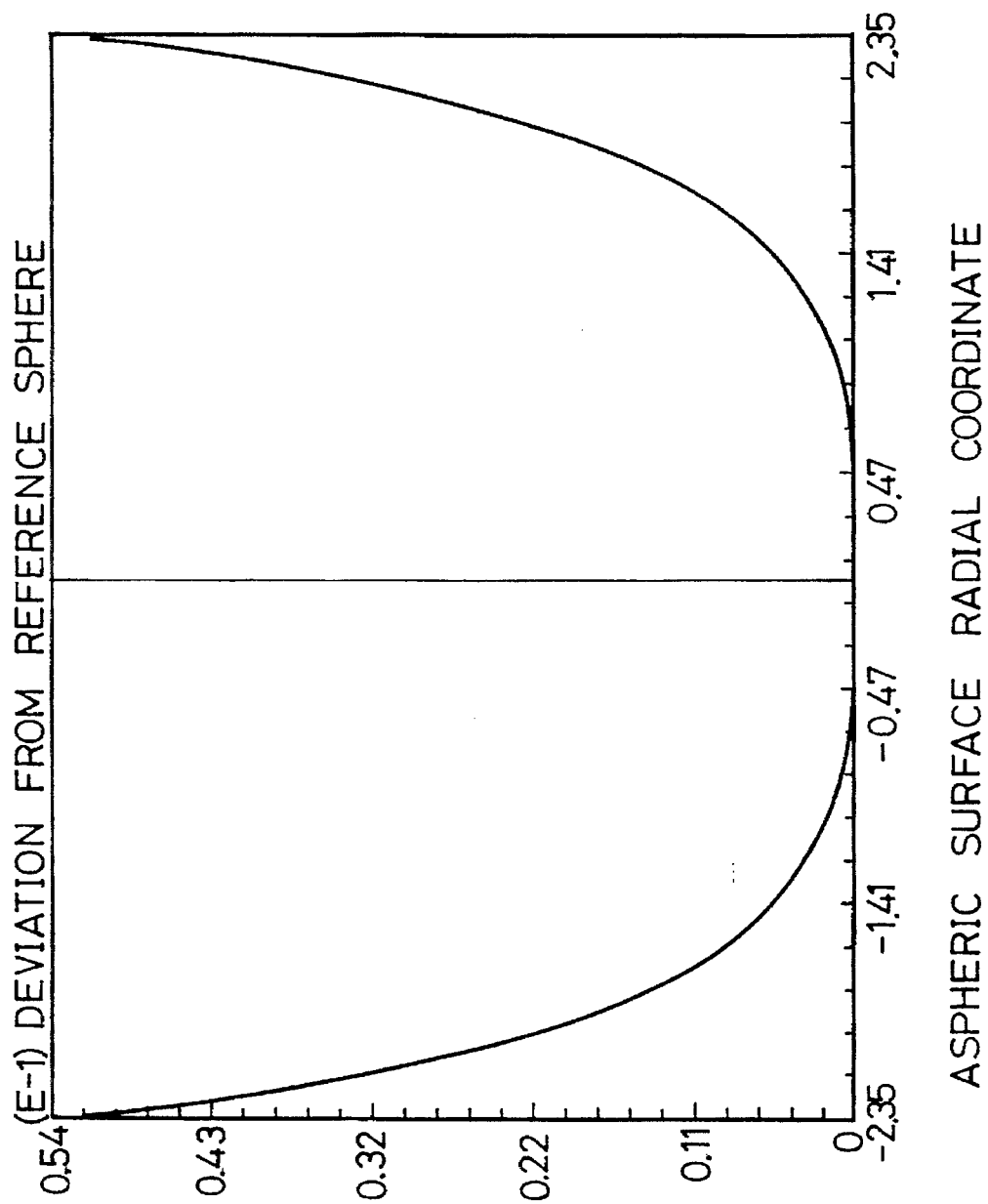
FIG. 7 is a deviation curve of the tested surface from various referenced surfaces after a calculation in accordance with the present invention.
Figure 8:
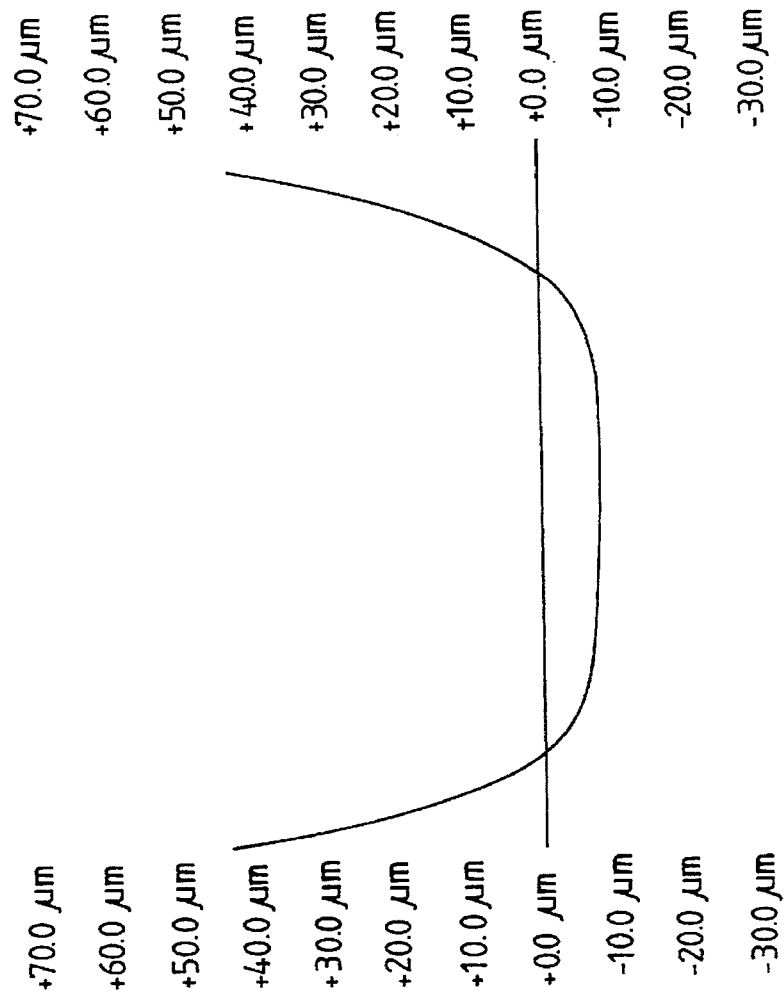
FIG. 8 is a tested deviation curve of the tested object tested by the Formtalysurf method, wherein the referenced requirements are identical with those in FIG. 7.

FIG. 6 shows the deviation curve calculated from the p points and the focus displacement obtained from the 37 steps described above, in which the small circles and solid line represent the raw data and the appropriate curves, respectively. The area under the solid line represents the deviation of the aspherical surface from the paraxial referenced spherical surface. FIG. 7 shows a curve obtained by integrating the curve in FIG. 6. FIG. 8 shows the curves obtained by using the Formatalysurt interferometer to measure the same aspherical surface. As can be seen from FIGS. 7 and 8, the difference of the two curve falls within 0.3 μm.

Accordingly, the method in accordance with the present invention for testing an aspherical surface can indeed overcome the disadvantages of null test which requires a specific construction of null test optical device, and since the present invention only utilizes the sparse area of the fringe to determine the lateral aberration of the referenced spherical surface from the tested aspherical surface, it avoids the drawback of high resolution requirement for non-null test in dealing with dense fringes. In accordance with the present invention, a regular interferometer can not only be built at a low price but also satisfy the need of today's industry for automatic production.

Although a specific embodiment of the invention has been disclosed, it will be understood by those having skill in the art that changes can be made to that specific embodiment without departing from the spirit and the scope of the invention.

We claim:

1. A method for testing an aspherical surface which uses a plurality of spherical surfaces with different paraxial radii of curvature as referenced spherical surfaces and an interferometer for measuring interferograms reflected from the aspherical object, said method comprising the steps of:

(a) moving said aspherical surface along an optical axis of said interferometer and measuring an amount of movement of said aspherical surface;

(b) recording two interferograms measured by said interferometer at each movement of said aspherical surface for each referenced spherical surface;

(c) finding out a point in each of said interferograms where the density of the interferogram is smallest and calculating a position thereof, said point being an intersection point of said aspherical object and one of said referenced spherical surfaces;

(d) calculating a lateral aberration (W(y)) of said aspherical surface from said referenced surfaces according to said amount of movement and said intersected positions; and (e) integrating the lateral aberration calculated by step (d) to obtain a profile of said aspherical surface.

2. The method according to claim 1, wherein the step of calculating the intersection point of said aspherical surface and each referenced spherical surface comprising the steps of:

(c1) moving said aspherical surface to de-focus said aspherical surface to obtain a first interferogram and recording the amount of movement of said aspherical surface;

(c2) moving slightly said aspherical surface to obtain a second interferogram which is phase shifted from said first interferogram and recording the amount of movement of said aspherical surface;

(c3) performing a Fast Fourier Transform to said first and second interferograms to obtain a spectral distribution diagram;

(c4) filtering positive or negative portions of said spectral distribution diagram and performing an inverse Fast Fourier Transform to said spectral distribution diagram to obtain a phase curve; and (c5) finding out points remaining unchanged after said two Fast Fourier Transform processing and calculating the positions of said points; said points being intersection points of said aspherical surface and each referenced spherical surface.

3. The method according to claim 1, wherein the step of calculating the amount of movement of said aspherical surface is measured by optical rules or laser range finder.

4. The method according to claim 1, wherein the paraxial radius of curvature of each referenced spherical surface is measured by said interferometer.

5. The method according to claim 1, wherein the deviation (W(y)) of said aspherical surface from each of said spherical surface to be tested is represented by the equation:

$$W(y) = -\int \frac{(p/f)t}{Q_0 C} \, dy$$

$$Q_0 C = r \sqrt{(1 + P_2 f_2)} \ast \sqrt{(1 - y_2/r_2)}$$

p is the distance between said intersection point and the optical axis of said interferometer;

t is the amount of movement of said aspherical surface;

f is the focus length of said interferometer;

r is the paraxial radius of curvature of one of said referenced spherical surfaces; and y is the y-axis coordinate of one of said referenced spherical surfaces.

6. The method according to claim 5, wherein the deviation of said aspherical surface from said referenced spherical surface is calculated by a personal computer.

7. A method for testing an aspherical surface which uses a plurality of spherical surfaces with different paraxial radii of curvature as referenced spherical surfaces and an interferometer for measuring interferograms reflected from the aspherical object, said method comprising the steps of:

(a) moving said aspherical surface along an optical axis of said interferometer and measuring an amount of movement of said aspherical surface;

(b) recording two interferograms measured by said interferometer at each movement of said aspherical surface for each referenced spherical surface;

(c) finding out a point in each of said interferograms where the density of the interferogram is smallest and calculating a position thereof, said calculating step comprising (c1) moving said aspherical surface to de-focus said aspherical surface to obtain a first interferogram and recording the amount of movement of said aspherical surface, (c2) moving said aspherical surface by a small amount to obtain a second interferogram which is phase shifted from said first interferogram and recording the amount of movement of said aspherical surface, (c3) performing a Fast Fourier Transform on said first and second interferograms to obtain respective first and second spectral distribution diagrams, (c4) filtering positive or negative portions of said first and second spectral distribution diagrams and performing Inverse Fast Fourier Transforms to said first and second spectral distribution diagrams to obtain respective first and second phase curves, and (c5) locating points remaining unchanged after performing said Fast Fourier Transform and said Inverse Fast Fourier Transform, said points being intersection points of said aspherical surface and each referenced spherical surface; (d) calculating a lateral aberration (W(y)) of said aspherical surface from said referenced surfaces according to said amount of movement and said intersected positions; and (e) integrating the lateral aberration calculated by step (d) to obtain a profile of said aspherical surface.

* * * * *